United States Patent
Sanctis et al.

(10) Patent No.: US 12,432,192 B2
(45) Date of Patent: Sep. 30, 2025

(54) COMBINED MOBILE APPLICATIONS

(71) Applicant: Bank of America Corporation, Charlotte, NC (US)

(72) Inventors: Jennifer Sanctis, Charlotte, NC (US); Mary Bangs, New York, NY (US); Veronica Andrea Cadavid, New York, NY (US); Taylor Farris, Hoboken, NJ (US); Trish Gillis, Chicago, IL (US); Jesse James Godley, Charlotte, NC (US); Brian Meyers, New York, NY (US); Vishwas Korde, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 347 days.

(21) Appl. No.: 18/221,423

(22) Filed: Jul. 13, 2023

(65) Prior Publication Data
US 2025/0023861 A1    Jan. 16, 2025

(51) Int. Cl.
  *G06F 7/04* (2006.01)
  *H04L 9/40* (2022.01)
(52) U.S. Cl.
  CPC ............................... *H04L 63/0815* (2013.01)
(58) Field of Classification Search
  CPC ...... G06F 21/60; G06F 21/335; G06F 21/629; H04L 63/0876; H04L 63/0815; H04L 63/10
  See application file for complete search history.

(56) References Cited

U.S. PATENT DOCUMENTS

| | | | |
|---|---|---|---|
| 9,075,978 B2* | 7/2015 | Schneider | G06F 21/572 |
| 11,882,103 B1* | 1/2024 | Jamison | G06F 21/32 |
| 2014/0237248 A1* | 8/2014 | Striem-Amit | G09F 19/22 713/171 |
| 2015/0156198 A1* | 6/2015 | Sabin | H04L 9/3247 713/176 |

OTHER PUBLICATIONS

La et al, Balanced MVC Architecture for Developing Service-Based Mobile Applications, IEEE, Nov. 12, 2010, pp. 292-299. (Year: 2010).*
Cheun et al, An Effective Framework for Monitoring Service-Based Mobile Applications, IEEE, Nov. 12, 2010, pp. 278-283. (Year: 2010).*

* cited by examiner

*Primary Examiner* — Philip J Chea
*Assistant Examiner* — Jenise E Jackson
(74) *Attorney, Agent, or Firm* — Weiss & Arons LLP

(57) ABSTRACT

Provided herein is a system for improved access by a user of mobile computing device to a plurality of remotely stored programs. The system may include a mobile computing device. The system may also include a mobile application. The mobile application may be installed on the mobile computing device. The system may also include a remote server. The server may house the remotely stored programs and shared application data associated with the programs. The data may optionally be stored on a separate content provider component. The mobile application may be configured to display one or more links to access each of the programs. Upon selecting the link(s), the mobile application may access dynamic content of the remote server on the mobile computing device. The mobile application may be configured to display the shared application data via an application-like interface.

4 Claims, 9 Drawing Sheets

COMBINED MOBILE APPLICATIONS

FIELD OF TECHNOLOGY

Aspects of the disclosure relate to methods for improving user experiences with mobile applications.

BACKGROUND OF THE DISCLOSURE

Users of mobile telephones and other computing devices often desire to use multiple applications concurrently or in conjunction with one another. For example, a user may desire to access status information about various activities (including, for example, industrial processes, project logistical information, insurance policies, or financial holdings). The various types of activities may be interconnected, but each may require a separate mobile application to access and/or manage the relevant data. Correct management of industrial and other types of processes may be contingent on ability to simultaneously access and manipulate the different bodies of data.

Simultaneous opening of multiple applications, for example mobile applications, typically requires that each application be installed on the relevant device, and that user authentication be performed separately for each application, which may increase the effort and difficulty involved in such activities.

Improved solutions for managing activities via mobile computing devices are needed in the art.

SUMMARY OF THE DISCLOSURE

It is an object of this invention to improve user experiences with mobile computing devices.

It is a further object of this invention to increase the efficiency of process management performed by mobile computing device users.

It is a further object of this invention to reduce the storage space needed for a mobile computing device to run multiple mobile applications.

It is a further object of this invention to provide a single application-like interface to a user wishing to access data content previously accessible only by simultaneously running several mobile applications.

A method in accordance with principles of the disclosure may be implemented by a computer and/or be automated.

A system or method in accordance with principles of the disclosure may utilize a computer processor and one or more non-transitory computer-readable media storing computer executable instructions. The instructions, when executed by the computer processor, may automatically access a cloud platform containing shared application data and perform various other activities, as described herein.

A system for improved access by a user to a plurality of mobile applications is provided. The system may include a mobile computing device. The system may include a first mobile application. The first mobile application may be installed on the mobile computing device. The first mobile application may be configured for installation on the mobile device. The system may include a second mobile application. The system may include a cloud platform. The cloud platform may include shared application data accessible to users of the second mobile application.

In some embodiments, the data may be stored on a content provider associated with the second mobile application.

In some embodiments, the second mobile application may be downloadable to the mobile computer device. In some embodiments, the second mobile application may be configured to be installed on the mobile device. The first mobile application may be configured to display a link to access the second mobile application. When a user selects the link, the first mobile application may be configured to ascertain whether the second mobile application is installed on the mobile computing device. In some embodiments, the mobile device may include a database of installed devices that is accessible by the first mobile application. In some embodiments, the first mobile application may be configured to query the database to ascertain whether the second mobile device is installed.

When the second mobile application is installed on the mobile computing device, the first mobile application may be configured to automatically open the second mobile application on the mobile computing device. When opened by this process, the second mobile application may be configured to automatically access the shared application data.

When the second mobile application is not installed on the mobile computing device, the first mobile application may be configured to automatically access content of the cloud platform on the mobile computing device. The content may be displayed via an application-like interface. The content may include the described shared application data. The content may be streamed from the cloud platform to the first mobile application.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
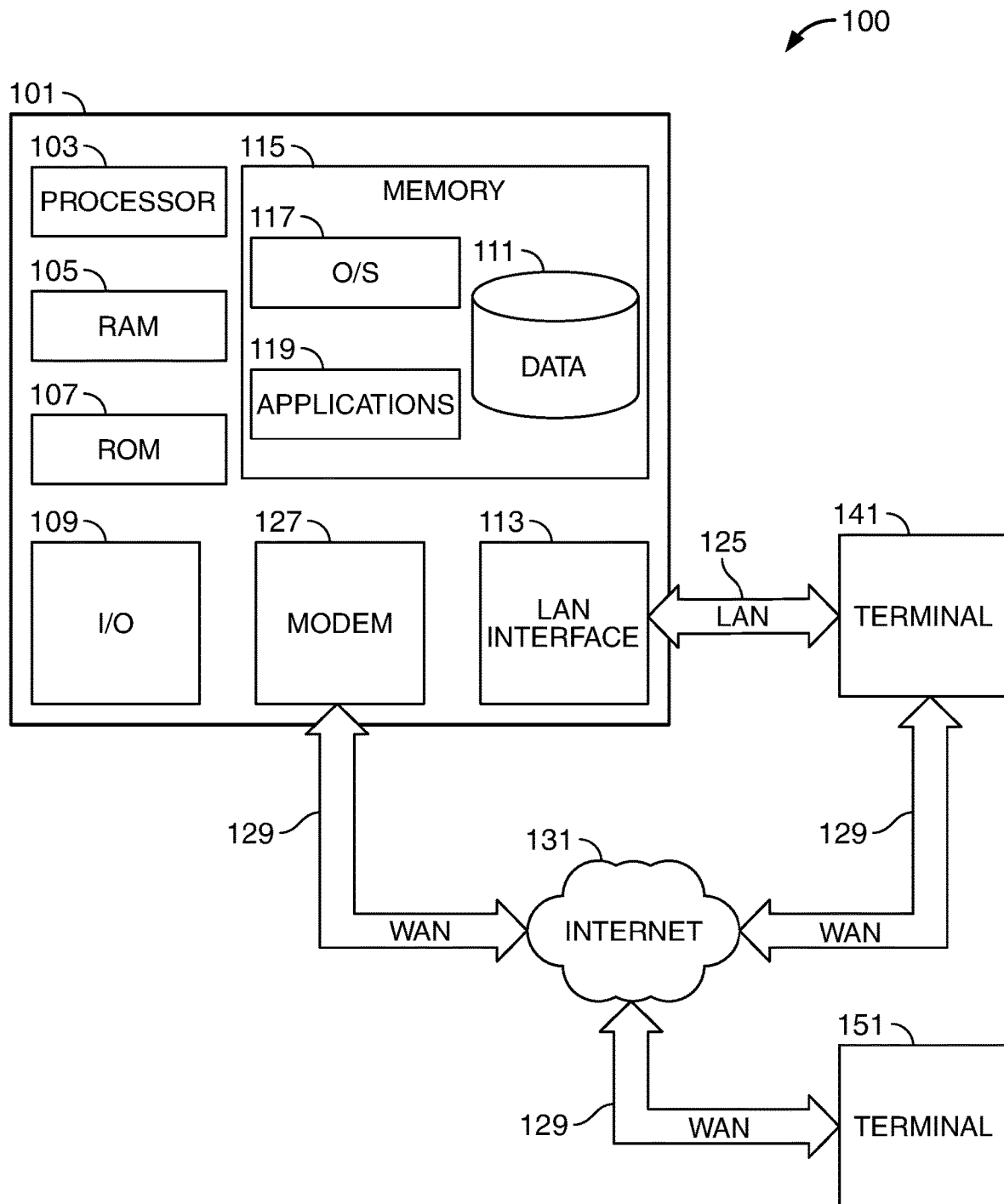
FIG. 1 shows an illustrative system in accordance with principles of the disclosure.

A method to facilitate access, by a user of a mobile computing device, to a remotely stored database is provided.

Embodiments of the system, as described herein, may leverage data streaming, and/or other complex, specific-use computer-implemented operations, to provide a novel approach for accessing dynamic datasets. The systems may utilize processors, which may include machine learning models, to improve data configurations in an automatic and iterative fashion for streaming datasets to mobile devices.

Certain embodiments of the present disclosure provide a technical solution to a technical problem of managing multiple mobile applications on a mobile device.

The present disclosure improves upon conventional approaches by providing an improved user experience for accessing remotely stored dynamic datasets.

Systems and methods are described for leveraging cloud-based platforms, and/or other complex, specific-use computer systems, to provide a novel approach for improving experiences of mobile device users and/or improving the efficiency of processes that can be managed by mobile device applications.

A method in accordance with principles of the disclosure may be implemented by a computer and/or be automated.

A system or method in accordance with principles of the disclosure may utilize a computer processor and one or more non-transitory computer-readable media storing computer executable instructions. The instructions, when executed by the computer processor, may automatically access a cloud platform containing shared application data and perform various other activities, as described herein.

In some embodiments, there is provided a system for improved access by a user to a plurality of mobile applications, in accordance with principles of the disclosure. The system may include a mobile computing device. The system may further include a first mobile application. The first mobile application may be installed on the mobile computing device. The system may further include a second mobile application. The system may further include a cloud platform. The cloud platform may include, or contain, shared application data accessible to users of the second mobile application. In some embodiments, the data may be stored on a content provider associated with the second mobile application. In some embodiments, the shared application data may also be accessible to users of the first mobile application, via a wireless interface that connects the first mobile application to computer functionality in the cloud platform. The mentioned functionality may enable the first mobile application to access and manipulate shared application data that would otherwise only be accessible to users of the second mobile application.

The term shared application data may refer to a body of data accessible to users of a particular mobile application. In some embodiments, the shared application data may be a dynamic dataset. In some embodiments, the dataset may be a dynamic dataset as defined herein. In some embodiments, the dataset may be designated for use by a particular mobile application, and the mobile application may be in turn designed to access the dataset. In other embodiments, the dataset may be accessible to multiple mobile applications, one of which is a mobile application, or a "first mobile application", mentioned in the context of the described methods and system.

In some embodiments of the described methods and systems, an application (for example, the first mobile application referred to in various embodiments described herein) may be a native application. The term native application may refer to an application developed specifically for a particular operating system. In some embodiments, the operating system may be the system on which the mobile device runs.

In some embodiments, the described second, or additional, mobile applications may also be native applications. In other embodiments, the second/additional applications may be configured to run both as native applications and using a remote data server—for example, as described herein. In some embodiments, the second/additional applications may be configured to be operated, or run, by a mobile device, even when not installed on the device. Such operation may be enabled via an interface between the described first mobile application and a computer functionality located in a cloud server. The first mobile application may orchestrate operating these additional application(s) while presenting an application-like user interface. For each second/additional application, the user interface may include the same set of widgets as the installed second/additional application. Alternatively, or in addition, the user interface may include the same set of functionalities as the installed second/additional application.

In some embodiments, the second mobile application may be downloadable and installable to the mobile computer device. In some embodiments, the second mobile application may be also configured to operate via the cloud platform. The first mobile application may be configured to display a widget, link, or icon to access the second mobile application. The widget, link, or icon may be designed to enable a user to access shared application data that is accessible via the second mobile application.

When a user selects (clicks on) the link, the first mobile application may be configured to ascertain whether the second mobile application is installed on the mobile computing device. In some embodiments, the mobile device may contain a database of installed devices that is accessible by the first mobile application. The first mobile application may query the database to ascertain whether the second mobile device is installed.

When the second mobile application is installed on the mobile computing device, the first mobile application may be configured to automatically open the second mobile application on the mobile computing device. After being opened via the first mobile application, the second mobile application may be configured to automatically access the shared application data. In other embodiments, if the second mobile application is installed on the mobile computing device, then the first mobile application may be configured to automatically open the second mobile application on the mobile computing device.

When the second mobile application is not installed on the mobile computing device, the first mobile application may be configured to automatically access content of the cloud platform on the mobile computing device. The content may include the described shared application data. The content may be displayed via an application-like interface. The access may be terminated when the first mobile application is closed. In other embodiments, if the second mobile application is not installed on the mobile computing device, then the first mobile application may be configured to automatically access content of the cloud platform on the mobile computing device.

The term application-like interface may include a dedicated icon that opens access to the relevant content. In some embodiments, the interface and/or icon may have a characteristic appearance representative of the features that enable access to the relevant content, as will be family to users of native mobile applications. Such an appearance can include a particular logo, typeface, layout, color scheme, symbols, and/or animations. In some embodiments, a widget or icon that appears in the first mobile application may be identical in appearance to the widget or icon used to open the second mobile application when it is installed on a mobile device. In some embodiments, the application-like interface fills the entire screen of the mobile device.

Alternatively, or in addition, an application-like interface may be configured to identify the mobile device that is accessing it and remember preferences of the user. In other embodiments, the interface remembers user information associated with the device.

In other embodiments, an application-like interface accesses the internal hardware of a mobile device. In other embodiments, an application-like interface accesses the operating systems of a mobile device. In other embodiments, an application-like interface accesses a location tracking feature of a device. In other embodiments, an application-like interface accesses a microphone and/or camera of a device. In other embodiments, an application-like interface accesses a contact list of a device. In other embodiments, an application-like interface accesses user interactions with a device, non-limiting examples of which are touch gestures and device tilt.

In other embodiments, an application-like interface accesses device security features, non-limiting examples of which are a fingerprint scan and face recognition.

In other embodiments, the cloud platform may be configured to identify the mobile device that is accessing it and remember preferences of the user. In other embodiments, the platform remembers user information associated with the device. In other embodiments, the first mobile device remembers preferences of the user for accessing the cloud platform. In other embodiments, the first mobile device remembers user information. In some embodiments, the first mobile device may be configured to transmit the user information and/or preferences each time it reconnects to the cloud platform.

In other embodiments, an application-like interface can be readily navigated by users unfamiliar with webpage navigation. In some embodiments, the interface does not require use of an address bar.

In other embodiments, an application-like interface may be configured to communicate with the mobile computing device's processor. In other embodiments, the interface communicates with the device's functionality. In some embodiments, the functionality may include location information of the device. In other embodiments, the interface enables push notifications from the device. In some embodiments, the push notifications may be activated when a user of the application fails to complete a user-initiated process or action after a set time period, for example after a time period between 1-10 minutes.

In some embodiments, one or more of the aforementioned characteristics of an application-like interface may be achieved by the described methods and compositions, without requiring periodic software updates, other than updates to the first mobile application.

The term "cloud platform" (and similar terms) may refer to an internet-based platform. The descriptor cloud-based, and similar terms, may indicate that the subject is based on the internet.

Alternatively, or in addition, the content of the cloud platform may be accessible by the first mobile application, without requiring use of an internet browser. In some embodiments, the content of the cloud platform may be accessible via the first mobile application, while the mobile device is not connected to a mobile network. In some embodiments, the described content may include shared application data.

In some embodiments of the described methods and systems, the interface of the first mobile application enables a view more consistent than a browser interface. In some embodiments, the interface of the first mobile application enables widget display more consistent than a browser interface The term "content", in the context of a cloud platform or other server or database, may refer to data relevant to data residing on the platform, server, or database. In the context of an application accessing a platform, server, or database, the term may refer to data that the application is configured to access. In some embodiments, the term may refer to a data type that the application is configured to manage. For example, in the case of an application intended to track logistics, the content may include logistical data. It will be appreciated that the platform, server, or database often need not provide an application or mobile device with access to an entire dataset. Rather, in some embodiments, the relevant portion(s) may be supplied to the application or mobile device.

In some embodiments, a mobile application of the described methods and systems may automatically connect to a data server. In some embodiments, the application may automatically download relevant data from a dynamic dataset stored on the server. In some embodiments, the mobile application may remain connected to the server by default, whenever the mobile application is open. In some embodiments, the mobile application remains connected to the data server by default, whenever the mobile device is connected to a mobile network. In some embodiments, the mobile application may update relevant data from the dataset, while running in the background of the device. In some embodiments, the mobile application may enable access to the dataset and/or dataset manipulations while disconnected from a mobile network. In some embodiments, the mobile application may transmit updates to the remote dataset, based on manipulations performed by the application, once it is reconnected to the mobile network. In some embodiments, the mobile application also updates its downloaded dataset from the cloud copy, upon reconnecting to the mobile network. In some embodiments, the mobile application that connects to the data server may be the described first mobile application.

In some embodiments, the first mobile application may be associated with an application manifest(s) that is specific for accessing a particular dynamic dataset stored in a cloud or remote server. In other embodiments, the first mobile application may be configured to access multiple dynamic datasets stored in a cloud or remote server; and the first application may be associated with a plurality of application manifests, each one specific for accessing a particular dynamic dataset. In some embodiments, the manifest(s) may be stored in a central processor that forms part of the described system or method. In some embodiments, the manifest(s) may be stored on the cloud or remote server that stores at least one dynamic dataset that the first mobile application is configured to access. In some embodiments, the manifest(s) may be stored on a remote platform.

In some embodiments, when the first mobile application is used to access content of the cloud platform, the system may be configured to identify the user. The first mobile application may present the identity of the user to the cloud platform. The cloud platform may save the user's preferences. In some embodiments, the cloud platform may remember the user's preferences when the first mobile application subsequently accesses the cloud platform.

In some embodiments, there is provided a method for improved access by a user to a plurality of mobile applications, in accordance with principles of the disclosure. The method may utilize a mobile computing device. The method may also utilize a first mobile application. The first mobile application may be installed on the mobile computing device. The method may also utilize a second mobile application. The method may also utilize a cloud platform. The cloud platform may include, or contain, shared application data accessible to users of the second mobile application. In some embodiments, the data may be stored on a content provider associated with the second mobile application. In some embodiments, the second mobile application may be a native application. In some embodiments, the second mobile application may be downloadable and installable to the mobile computer device. In some embodiments, the second mobile application may also be configured to operate via the cloud platform.

In some embodiments, the method may include the step of the first mobile application displaying a link, widget, or icon, to access, or open, the second mobile application. The method may also include the step of a user selecting the link, widget, or icon. The method may also include the step of the first mobile application ascertaining whether the second mobile application is installed on the mobile computing device. The ascertaining step may be actuated by the user selecting the link. The mobile device may contain a database of installed devices that is accessible by the first mobile application. The method may also include the step of the first mobile application querying the database to ascertain whether the second mobile device is installed.

When the second mobile application is installed on the mobile computing device, the first mobile application may automatically open the second mobile application on the mobile computing device. When the second mobile application is not installed on the mobile computing device, the first mobile application may automatically access content of the cloud platform on the mobile computing device. The content may be displayed via an application-like interface. The application-like interface may be automatically opened from within the first mobile application.

If the second mobile application is installed on the mobile computing device, then the first mobile application may automatically open the second mobile application on the mobile computing device. If the second mobile application is not installed on the mobile computing device, then the first mobile application may automatically access content of the cloud platform on the mobile computing device. The content may be displayed via an application-like interface. The application-like interface may be automatically opened from within the first mobile application.

In some embodiments of the described systems and methods, the second mobile application may be configured to accept authentication in the first mobile application in lieu of further authentication in the second mobile application. In some embodiments, once the user has provided credentials for the first mobile application, credentials need not be provided for the second mobile application.

In some embodiments, the first mobile application determines whether the second mobile application is installed on the mobile computing device. If this is not the case, the first mobile application may be further configured to present the user an option to either (a) download the second mobile application; or (b) access the content via the application-like interface. Downloaded applications in the described systems and methods may subsequently be installed on the device.

In some embodiments, the first mobile application may be associated with an application manifest(s) that is specific for accessing a particular dynamic dataset stored in a cloud or remote server. In other embodiments, the first mobile application may be both configured to access multiple dynamic datasets; and associated with a plurality of application manifests. Each manifest may be specific for accessing a particular dynamic dataset stored in a cloud or remote server. In some embodiments, the application manifest(s) may be stored in the cloud server.

In some embodiments, the first mobile application may save preferences of the user for accessing the second mobile application and remember the preferences when the second mobile application is subsequently accessed.

In some embodiments of the described methods and systems, the first and second (or "additional") mobile applications may have been created by the same developer. In some embodiments, the applications may be configured to be modified in concert with one another, such that compatibility is maintained. In some embodiments, the applications may be configured to be modified in tandem, by the developer. In some embodiments, the applications may be modified in concert with one another by the developer, such that compatibility is maintained.

In other embodiments, the first and second/additional mobile applications may have been created by separate developers. In some embodiments, the developers may work in concert to attain a common authentication platform that is recognized across the relevant applications. In other embodiments, the relevant applications may be configured to recognize a common authentication platform. In some embodiments, the common platform may be developed jointly by the developers of more than one of the applications in the system or method.

In some embodiments, there may be provided a system for improved access by a user of mobile computing device to a plurality of remotely stored programs, in accordance with principles of the disclosure. In some embodiments, the system may include a mobile computing device. In some embodiments, the system may also include a mobile application. The mobile application may be installed on the mobile computing device.

In some embodiments, the system may also include a remote server. The server may be a centralized server for all users of the associated programs. The associated programs may be programs stored on the remote server. The server may be cloud based. In various embodiments, the server may house, host, and/or store the remotely stored applications or programs and shared application data associated with the applications or programs. The server may house content associated with the applications or programs. Content may be as defined herein. The data may optionally be stored on a separate content provider component. The content provider component may be associated with a network that serves as the environment for the described system. In some embodiments, the network may be a 5G network. In other embodiments, the network may be a 5G or faster network.

In some embodiments of the described systems and methods, the mentioned remote server may be a remote platform. In some embodiments, the platform may be a cloud-based platform.

The mobile application may be configured to display one or more links, icons, or widgets to individually access each of the programs. Upon selecting a link, icon, or widget, the mobile application may be configured to access content of the remote server on the mobile computing device. The content may be dynamic content. Dynamic content may refer to content of a dataset that is modifiable by users of the associated program(s). The dataset may include shared application data.

The link(s) referred to in the described systems and methods may be, in some embodiments, default or standard deep links. In other embodiments, the link(s) may be contextual application deep links.

The mobile application may be configured to display the shared application data via an application-like interface. The shared application data may be as defined herein.

In some embodiments of the system, authentication in the mobile application enables accessing the described content of the programs, without the programs requiring further authentication from the user. In some embodiments, the mobile application may be configured to access the content without utilizing an internet browser. Alternatively, or in addition, the mobile application may be configured to access the content without needing to download or install additional applications, other than the first mobile application. In some embodiments, the mobile application enables access to the described content, without concern for the security of unknown internet address links.

In other embodiments, the mobile application may be configured to identify the user, save preferences of the user for accessing the content, and remember the preferences for subsequent access to the content. In some embodiments, the preferences may be applied in subsequent sessions of use of the application.

In some embodiments, the remote server may be configured to stream the content to the mobile computing device. The described mobile application may receive the streamed data or content.

In some embodiments, there is provided a method for improved access by a user of mobile computing device to a plurality of remotely stored programs, in accordance with principles of the disclosure. In some embodiments, the method may utilize a mobile computing device. In some embodiments, the system may also include a mobile application. The mobile application may be installed on the mobile computing device.

In some embodiments, the method may also utilize a remote server. The server may be a centralized server for all users of the associated programs. The associated programs may be programs stored on the remote server. The server may be cloud based. In various embodiments, the server may house, host, and/or store the remotely stored programs and shared application data associated with the applications or programs. The server may house content associated with the applications or programs. Content may be as defined herein. The data may optionally be stored on a separate content provider component. The content provider component may be associated with a network that serves as the environment for the described system.

The method may include the step of the mobile application displaying one or more links, icons, or widget to access each of the programs. Upon selecting a link, icon, or widget, the mobile application may access content of the remote server on the mobile computing device. The content may be dynamic content. Dynamic content may refer to content of a dataset that is modifiable by users of the associated program(s).

The method may also include the step of the mobile application displaying the shared application data via an application-like interface. The shared application data may be as defined herein.

In some embodiments of the method, authentication in the mobile application enables accessing the described content of the programs, without requiring further authentication from the user. In some embodiments, the mobile application may access the content without utilizing an internet browser. Alternatively, or in addition, the mobile application may access the content without needing to download or install additional applications, other than the first mobile application.

In other embodiments, the mobile application may identify the user, save preferences of the user for accessing the content, and remember the preferences for subsequent access to the content.

In some embodiments, the remote server may stream the content onto the mobile computing device. The streaming may be to the described mobile application.

In some embodiments, there is provided a method for a user of a mobile computing device to access a plurality of mobile applications installed on the mobile computing device, in accordance with principles of the disclosure. The method may include the step of opening a first mobile application on the mobile computing device. The application may be opened by the user, by activation of a widget. The method may also include the step of authenticating the user in the first mobile application. The user may provide identifying information to perform the authentication. The method may also include the step of transmitting a request to open a second mobile application. The request may be transmitted via activation by the user of a link, widget, or icon displayed on an interface of the first mobile application. The method may also include the step of automatically transmitting an authentication notification from the first mobile application to the second mobile application. The method may also include the step of automatically authenticating the user in the second mobile application when the authentication notification is received.

In some embodiments, the described first and second mobile applications may access linked datasets. Linked datasets may refer to datasets associated with linked user accounts. An account may refer to information about the dealings, transactions, and/or holdings of a particular user. Linked user accounts may refer to accounts associated with the same user.

In some embodiments, the first mobile application may save preferences of the user for accessing the second mobile application and remember the preferences when the second mobile application is subsequently accessed.

In some embodiments of the described methods, the first and second (or "additional") mobile applications were created by the same developer. In some embodiments, the method may include the additional step of the developer modifying the applications in concert with one another, such that compatibility is maintained.

In other embodiments, the first and second/additional mobile applications were created by separate developers. In some embodiments, the method may include the additional step of the developers working in concert to attain a common authentication platform that is recognized across the relevant applications.

In some embodiments, there is provided a system enabling a user of a mobile computing device to access a plurality of mobile applications installed on the mobile computing device, in accordance with principles of the disclosure. The system may include a first mobile application on the mobile computing device, wherein the mobile application is configured to be opened upon activation of a widget by the user. The first mobile application may also be configured to authenticate a user upon provision of identifying information by the user. The first mobile application may also be configured to transmit a request to open a second mobile application. The request may be transmitted via activation by the user of a link, widget, or icon displayed on an interface of the first mobile application. The first mobile application may also be configured to automatically transmit an authentication notification to the second mobile application. The second mobile application may be configured to automatically authenticate the user, upon receiving the authentication notification.

In some embodiments, the first mobile application may be configured to save preferences of the user for accessing the second mobile application and remember the preferences when the second mobile application is subsequently accessed.

In some embodiments of the described systems, the first and second mobile applications were created by the same developer. In some embodiments, the applications may be configured to be modified in concert with one another, such that compatibility is maintained. In some embodiments, the modification is performed by the developer.

In other embodiments, the first and second mobile applications were created by separate developers. In some embodiments, the applications may be configured to recognize a common authentication platform. In some embodiments, the authentication platform may be developed jointly by the developers of the first and second applications.

In some embodiments, there is provided a system, in accordance with principles of the disclosure. The system may include a mobile computing device. The system may also include several mobile applications, one of which will be referred to as the first mobile application. In some embodiments, the first mobile application may be installed on the mobile computing device.

In some embodiments of the described methods and systems, the first mobile application has a browser-like interface. In some embodiments, the interface contains an address bar. In some embodiments, the bar may be at the top of the window. In other embodiments, the bar may be at the bottom of the window. In other embodiments, the bar may be at any location within the interface window. In some embodiments, the bar may be a text field. In some embodiments, the bar may be configured so that a user can enter the name of a desired program or dataset. In other embodiments, the bar may be configured so that a user can enter a location identifier of a desired program or dataset. In some embodiments, the bar enables live character upload. In some embodiments, the bar feature provides suggestions for sites or searches, or for the name(s) of mobile application(s), program(s), or dataset(s).

The system may also include two or more additional mobile applications. In some embodiments, the system contains more than 2, more than 3, more than 5, more than 7, or more than 10 additional mobile applications. In other embodiments, the system contains 2-10, 3-10, 5-10, 7-10, 2-20, 3-20, 5-20, 7-20, or 10-20 additional mobile applications.

The system may also include a mobile application server. The application server may optionally be a cloud server. In other embodiments, the application server may house a central database. In some embodiments, the application server stores the additional mobile applications. In various embodiments, the application server may include the applications; software required to install the applications on a mobile device; or both the applications and the installation software.

In some embodiments, the application server also houses the first mobile application. In other embodiments, the application server does not house the first mobile application.

The system may also include a data server. In some embodiments, the data server is optionally a cloud server. In other embodiments, the data server may house a central database that is used for any of various functions described herein.

The system may also include one or more dynamic datasets. In some embodiments, the dynamic dataset(s) may be stored on the aforementioned data server. In some embodiments, the data server houses the dynamic dataset(s).

In some embodiments, the term dynamic dataset refers to a dataset whose content is modifiable by users of a mobile application that is configured to access the dataset. In some embodiments, the mobile application configured to access the dataset may be one or more of the mentioned additional mobile applications. In some embodiments, the dynamic dataset may be a shared dataset among users of a particular mobile application. In some embodiments, the dynamic dataset may include both data points specific to particular users and data points relevant to the dataset in general.

In some embodiments, each of the plurality of additional mobile applications may be mapped to at least one dynamic dataset(s). In other embodiments, each of the plurality of additional mobile applications may be configured to utilize at least one dynamic dataset(s).

Reference herein to a mobile application being "mapped" to a particular dataset may be intended to convey that that application is specifically designed to access and manipulate the dataset, or a subset thereof. As one non-limiting example, a location tracking application may be mapped to a dataset containing location metadata of a fleet of taxis. As another non-limiting example, an inventory tracking application may be mapped to a dataset reflecting inventory of particular supplies. In some embodiments, there may be a one-to-one correspondence between the mobile applications stored on the application server and the dynamic datasets stored on the data server. In other embodiments, there may be multiple mobile applications mapped to the same dataset.

In some embodiments, each dynamic dataset may be assigned a default mobile application, which is designated as the default application for accessing that dataset. In some embodiments, a relational database of datasets and their corresponding mobile applications may be stored on a central processor. The first mobile application may serve as a portal for a user to request access to a particular type of data, for example, locations of vehicles in a fleet, inventory information, financial metrics, factory production yields, or the like. The first mobile application may request the central processor to identify the dataset most relevant to the requested information and/or the mobile application assigned to that dataset. The central processor may transmit this information to the first mobile application. In other embodiments, the first mobile application may itself store a relational database of datasets and their corresponding mobile applications relevant to each type of data that can be requested on the interface of the first mobile application.

In some embodiments, regardless of whether additional mobile application(s) were downloaded onto mobile device, the first mobile application may display on its interface a dataset access link or widget, which may be selectable by a user. The dataset access link or widget may map to a dynamic dataset of interest, which may be stored on a remote data server. Alternatively, or in addition, the dataset access link or widget may map to a particular data type of interest, which may be stored on a remote data server. The dataset access link or widget may appear similar or identical to the aforementioned download widget. However, when selected from within the first mobile application, the dataset access link or widget does not necessarily cause the mobile device to download a particular mobile application.

In some embodiments, when the dataset access link or widget is selected by the user, the described method or system may ascertain whether the default mobile application for accessing the relevant dataset is installed on the device. If yes, the default mobile application may be used to access and/or manipulate the dataset. If the default mobile application is not installed on the device, then the first mobile application may be configured to pursue one or more alternative methods of accessing the dataset, for example as described herein. For example, the first mobile application may present the user with an option to download the default mobile application. In other embodiments, the first mobile application may request that the data server stream the dataset to the mobile device on which the first mobile application is installed. In other embodiments, the first mobile application may receive the streamed dataset.

It is clarified that, in some embodiments, the described systems do not require that every single mobile application stored on the application server can be mapped to at least one dynamic dataset. Rather, the disclosure encompasses systems that have at least 2, at least 3, etc., mobile applications that can be mapped to at least one dynamic dataset, regardless of the (optional) presence of mobile applications that are not mapped to at least one dynamic dataset.

The application server may also be configured to perform the following first and second functions, for a plurality of additional mobile applications:

First, the server may be configured to receive an installation request from the mobile computing device to download and install the additional mobile application. In some embodiments, the first mobile application itself may be configured to transmit the installation request to the application server, and the application server may be configured to accept the installation request. In some embodiments, the interface of the first mobile application displays a link, widget, or icon that, when selected, transmits the installation request to the application server.

Second, the server may be configured to, upon receiving the installation request, transmit to the mobile computing device the additional mobile application and/or software necessary to install the mobile application. In some embodiments, the software necessary to install the additional mobile application may be identical to the mobile application itself. In other words, the server may be configured to transmit to the mobile computing device a copy of the mobile application.

It is clarified that, in some embodiments, the described systems do not require that the application server be configured to perform the aforementioned first and second functions for every single mobile application stored on the server. Rather, disclosed systems may include an application server that stores at least 2, at least 3, etc. mobile applications for which these functions can be performed by the server, regardless of the (optional) presence of mobile applications for which the server is not configured to perform these functions.

The described first mobile application may be configured, in some embodiments, to perform each of the following three functions or operations, for one or more dynamic datasets. In other embodiments, the first mobile application may be configured to direct a processor of the mobile device to perform each of the following three functions or operations, for each of the dynamic dataset(s).

As a first function, the first mobile application may be configured to receive a request to access the dynamic dataset, which may be referred to herein as a content access request. The request may be received via selection of, or activation, by the user (colloquially referred to as "clicking on") a link displayed on the first mobile application's interface. A dataset for which this request is received is hereinafter referred to as a requested dynamic dataset.

In other embodiments, the interface of the first mobile application may display one or more widgets for requesting access to a particular type of data, for example, logistical data, inventory data, financial metrics, customer information, fleet location information, or the like.

In some embodiments, the one or more widgets may be displayed on the interface of the first mobile application in an array. The array may resemble the display of widgets for opening applications installed on a mobile device. Such arrays may typically be displayed on the home screen of a mobile device.

It will be appreciated that the disclosed systems and methods do not require a particular method of selecting a link, widget, or icon. In some embodiments, the link, widget, or icon may be selected by clicking, tapping, or hovering over the link, widget, or icon. In some embodiments, the mentioned link may be a hyperlink.

As a second function, the first mobile application may be configured to access a database or list of the mentioned additional mobile application(s) that are mapped to the requested dynamic dataset. In other embodiments, the data server may be configured to access a database or list of the mentioned additional mobile application(s) that are mapped to the requested dynamic dataset. The first application or data server may query the database. The first application or data server may obtain a list of mapped applications from the database. The database may be a relational database. In some embodiments, the list may include every application in the application store that maps to a particular dataset. In some embodiments, the first mobile application or data server may determine which additional mobile application(s) are mapped to the requested dynamic dataset. The mobile application(s) that map to the requested dataset are hereinafter referred to as mapped mobile application(s). In some embodiments, receipt of the content access request by the first mobile application signals the first mobile application to access the described dataset of additional mobile applications and datasets mapped to the applications. In some embodiments, the database or list may be stored on the device. In other embodiments, the database or list may be stored on the data server. In other embodiments, the database or list may be stored on the application server.

As a third function, the first mobile application may be configured to ascertain whether at least one mapped mobile application is installed on the mobile computing device. If only one mapped mobile application is identified, the first mobile application may determine whether the mapped application is installed on the mobile device. Alternatively, the data server may query the mobile device to determine whether at least one mapped mobile application is installed on the mobile computing device.

It will be appreciated that embodiments of the described methods and systems encompass instances where the first mobile application can perform all 3 of the above functions or operations for only a subset of the dynamic datasets stored on the data server. In some embodiments, the relevant criterion may be the presence of at least 2, at least 3, at least 4, etc., dynamic datasets for which the first mobile application can perform the described functions or operations, even if additional dynamic datasets (for which the first application cannot perform at least one of the three described functions or operations) are present.

When the mapped mobile application(s) is installed on the mobile computing device, then the first mobile application may be configured to automatically open the mapped mobile application(s). The mapped mobile application may be configured to automatically request access to the requested dataset(s). In some embodiments, the mapped application may be configured to automatically access the requested dataset. The step of opening the mapped mobile application(s) may be contingent upon the mapped application(s) being installed on the mobile device.

When none of the mapped mobile application(s) are installed on the mobile computing device, then the first mobile application may be configured to automatically request that the data server stream the requested dynamic dataset(s) to the mobile device. In other embodiments, the first mobile application may be configured to access and/or perform manipulations on the (remotely stored) dynamic dataset. The step of requesting that the data server stream the requested dynamic dataset(s) may be contingent upon the mapped application(s) being installed on the mobile device.

In other embodiments, in the case of a preferred, or default, mapped mobile application for a particular dataset, when the preferred, or default, mapped mobile application is not installed on the mobile computing device, then the first mobile application may be configured to automatically request that the data server stream the requested dynamic dataset(s) to the mobile device. In other embodiments, if the preferred, or default, mapped mobile application is not installed on the mobile computing device, then the first mobile application may be configured to automatically request that the data server stream the requested dynamic dataset(s) to the mobile device. In other embodiments, the first mobile application may be configured to access and/or perform manipulations on the (remotely stored) dynamic dataset.

In some embodiments, reference herein to streaming a dataset, or similar language, does not require that the entire dataset be transmitted, or copied, to the destination device. In some embodiments, at least a portion of the requested dataset needs to be streamed to the device. In some embodiments, a portion of the dataset may be transferred that is sufficient to perform the manipulations desired by the user. In other embodiments, a portion of the dataset may be transferred that is sufficient to provide the information access requested by the user.

In some embodiments, the described data server may be configured to perform both of the following functions or operations:

As a first function, the data server may be configured to enable the described mapped mobile application(s) to access the requested dynamic dataset. In some embodiments, access may be provided upon receiving a request from the first mobile application. In other embodiments, the data server may be configured to provide the described dataset access, upon receiving a request from the mapped mobile application. In some embodiments, access may be provided when a user of the mobile computing device is authenticated for the mapped application. In other embodiments, the user need not be separately authenticated in the mapped application.

As a second function, the data server may be configured to stream the requested dynamic dataset to the first mobile application. In some embodiments, the dataset may be streamed upon request by the first mobile application. In some embodiments, the streaming commences automatically. In some embodiments, the streaming may be performed when the first mobile application indicates to the data server that no mapped mobile application is installed on the mobile device.

In some embodiments, one or more of the additional mobile applications may be configured to accept authentication in the first mobile application in lieu of further authentication in an additional mobile application. In other embodiments, two or more of the additional applications may be configured to accept this authentication. In other embodiments, three or more of the additional applications may be configured to accept this authentication. In other embodiments, four or more of the additional applications may be configured to accept this authentication.

In some embodiments, the described additional mobile application(s) may access dataset(s) linked to another dataset that is accessible from the first mobile application. Linked datasets may refer to datasets associated with linked user accounts. An account may refer to information about the dealings, transactions, and/or holdings of a particular user. Linked user accounts may refer to accounts associated with the same user.

In some embodiments, the requested dynamic dataset may be accessible via the usual interface of the first mobile application. The usual interface may refer, in some embodiments, to the interface displayed by the first mobile application when accessing a dataset(s) to which the first mobile application is mapped. In some embodiments, the requested dynamic dataset may be accessible via a browser-like interface. In some embodiments, the browser-like interface may be as defined herein.

In other embodiments, there is provided a method of accessing multiple datasets of interest, using a mobile computing device. The method steps may correspond to the steps described in the context of any of the aforementioned systems.

In other embodiments, a machine learning algorithm may be utilized to improve the data configuration, for a streaming step of any of the described systems or methods. In some embodiments, the improvement may be automatic and iterative. The process may be used to improve one of the described systems or methods for accessing a dynamic dataset from a mobile device. A mobile computing device may request access to a dynamic dataset stored on a cloud or a remote data server. A central processor associated with the cloud or remote server may stream the dataset to the mobile computing device, initially using the default data configuration rules for that dataset. In some embodiments, the central processor may be integrated within the cloud or remote server. In other embodiments, the central processor may not be stored on the cloud or remote server.

In other embodiments, the central processor streams a dataset to a mobile application. The initial data configuration rules may be the default rules for the mobile application.

Results of the data streaming step, including the data configuration utilized, may be transmitted to and evaluated by an artificial intelligence or machine learning engine or algorithm. Transmission of the results to the engine or algorithm may be from the mobile device. Transmission of the results may be from the central processor.

The engine algorithm may obtain alternative data configuration(s) from a data configuration rule repository, which may be optionally stored in the system. In other embodiments, the repository is not stored in the system. The algorithm may instruct the central processor to utilize one or more alternative data configurations for future data streaming operations, for example for a different user requesting access to the dataset. The central processor may use the alternative data configuration for a future streaming step, for example to a different mobile device. Results of data streaming using alternative data configurations may be similarly evaluated by the algorithm. The results of the different streaming operations may be used to train the algorithm. The algorithm may propose revised default streaming data configuration rules. Alternatively, the algorithm may draft new data configuration rules, which may be used for the next streaming operation. In various embodiments, the algorithm may iteratively perform the described process, to optimize data configurations for a particular type of dataset, a particular mobile application, or a combination of a particular type of dataset with a particular mobile application. Iterations may continue until the engine or algorithm determines that optimization of the data configuration rules is sufficient to create new default rules, after which the algorithm may propose final/revised default streaming data configuration rules.

The aforementioned processing device or computer processor may be a computer, as described in more detail in FIG. 1, optionally including any of the components and elements described for FIG. 1.

Figure 2:
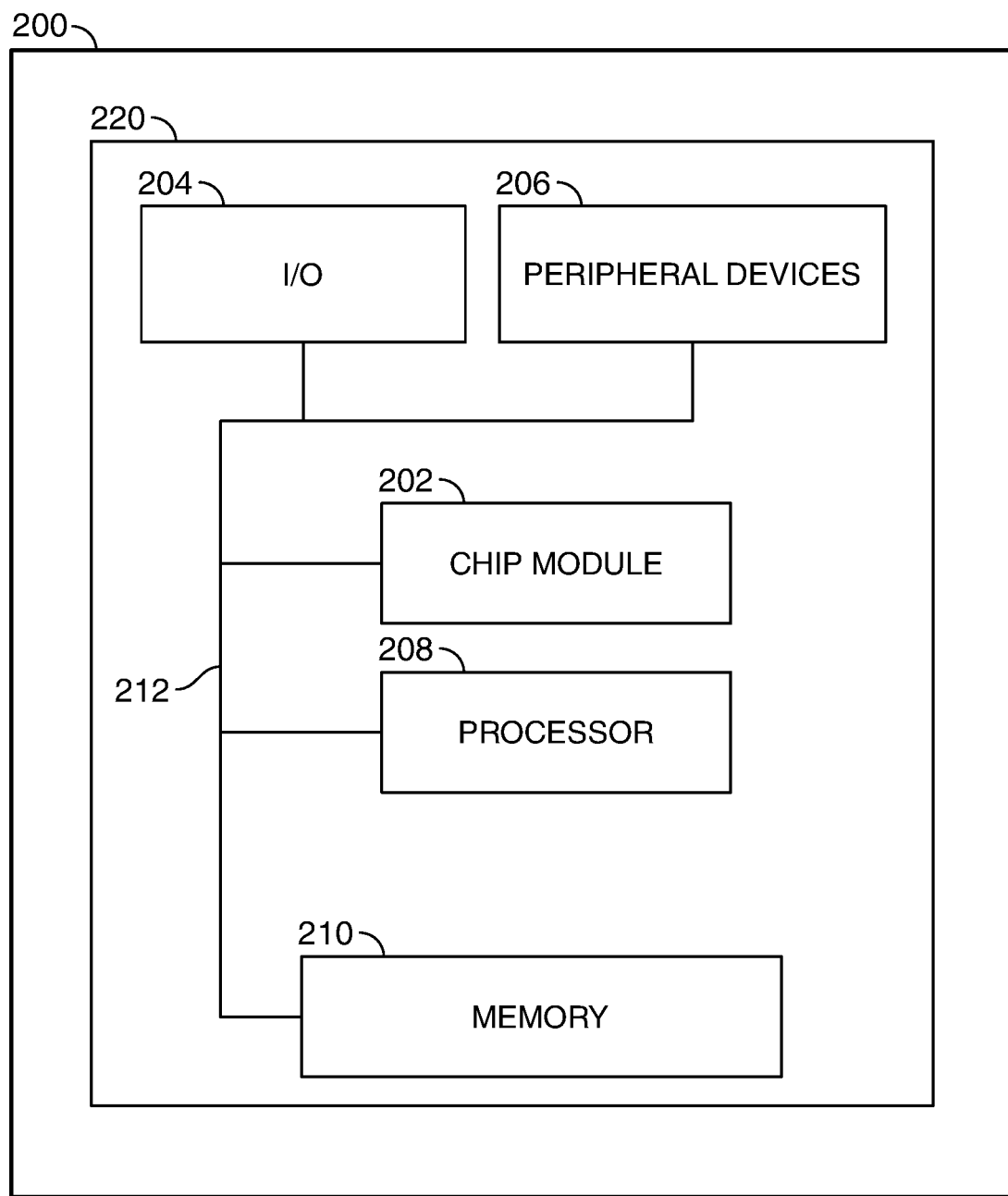
FIG. 2 shows an illustrative system in accordance with principles of the disclosure, FIG. 3 provides a flow chart depicting the operation of a system for improved access by a user to a plurality of mobile applications.

In some aspects, the processing device or computer processor may be a computer, as described in more detail in FIG. 2, optionally including any of the components and elements described for FIG. 2.

Apparatuses and methods described herein are illustrative. Apparatuses and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made, without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as a "computing engine," a "server", or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory. The instructions may cause the system to open a mobile application interface, access one or more cloud servers, including applications and their associated data, perform manipulations on datasets, download additional one or more mobile applications, and/or authenticate a user.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions, such as accessing applications and associated data from cloud servers, performing manipulations on datasets, and authenticating a user.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing"). The servers may supply mobile applications and datasets that the applications are configured to access and manipulate.

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines, for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
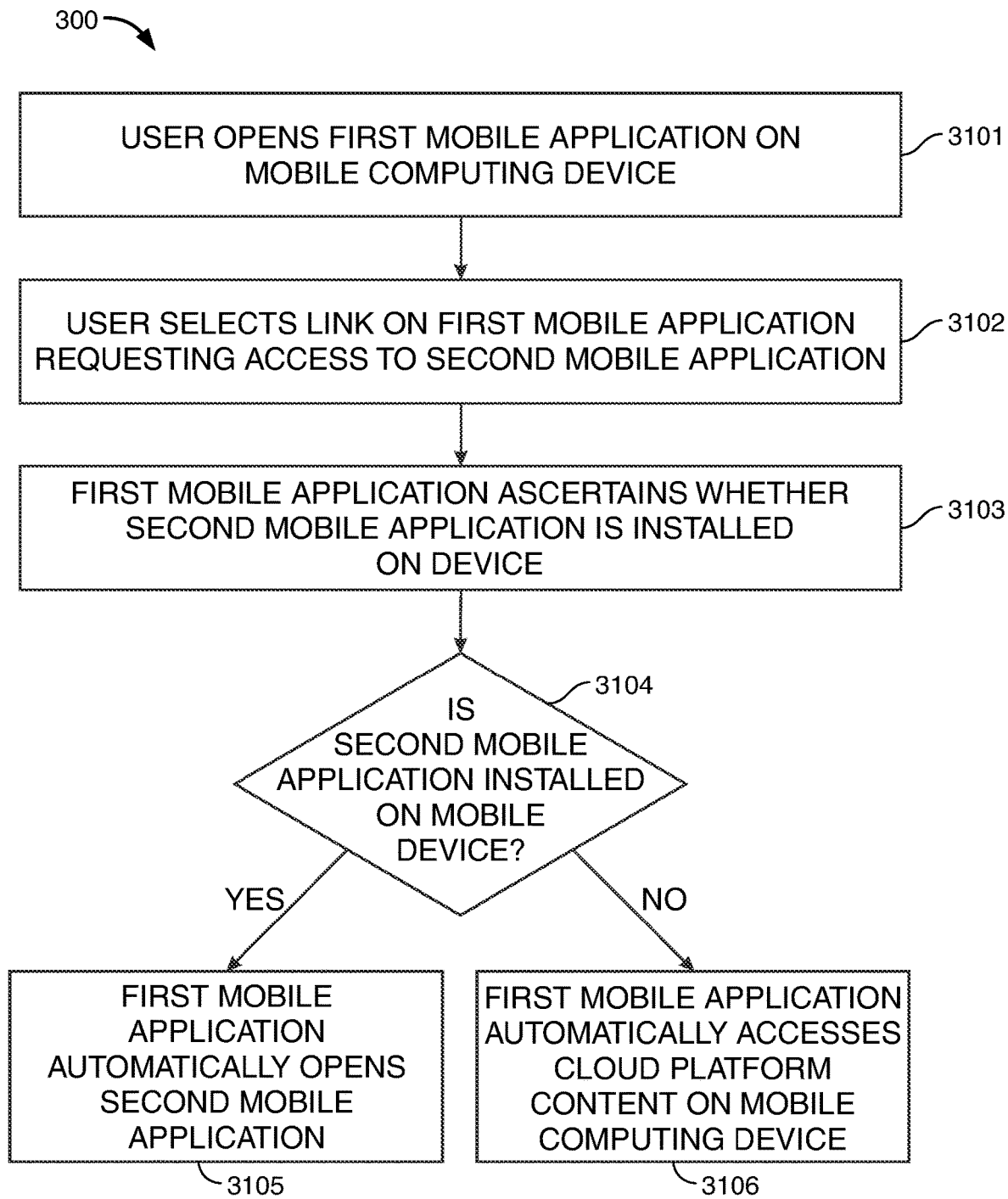

FIG. 3 is a flow chart depicting the operation of a system 300 for improved access by a user to a plurality of mobile applications, in accordance with principles of the disclosure. System 300 may include a mobile computing device. The system may also include a first mobile application. The first mobile application may be installed on the mobile computing device. The system may further include a second mobile application. The second mobile application may be downloadable and/or installable to the mobile computer device. In some embodiments, the second mobile application may also be configured to operate via a cloud platform.

At step 3101, a user may open the first mobile application, which may be configured to display a link to access the second mobile application. At step 3102, when the user selects the link, the first mobile application may ascertain whether the second mobile application is already installed on the mobile computing device (step 3103), resulting in a decision point (step 3104). Consequently:

At step 3105, if the second mobile application is installed on the mobile device, the first mobile application may automatically open the second application on the mobile device.

At step 3106, if the second mobile application is not installed on the mobile computing device, the first mobile application may automatically access content of the cloud platform on the mobile computing device. The content may be displayed via an application-like interface.

Figure 4:
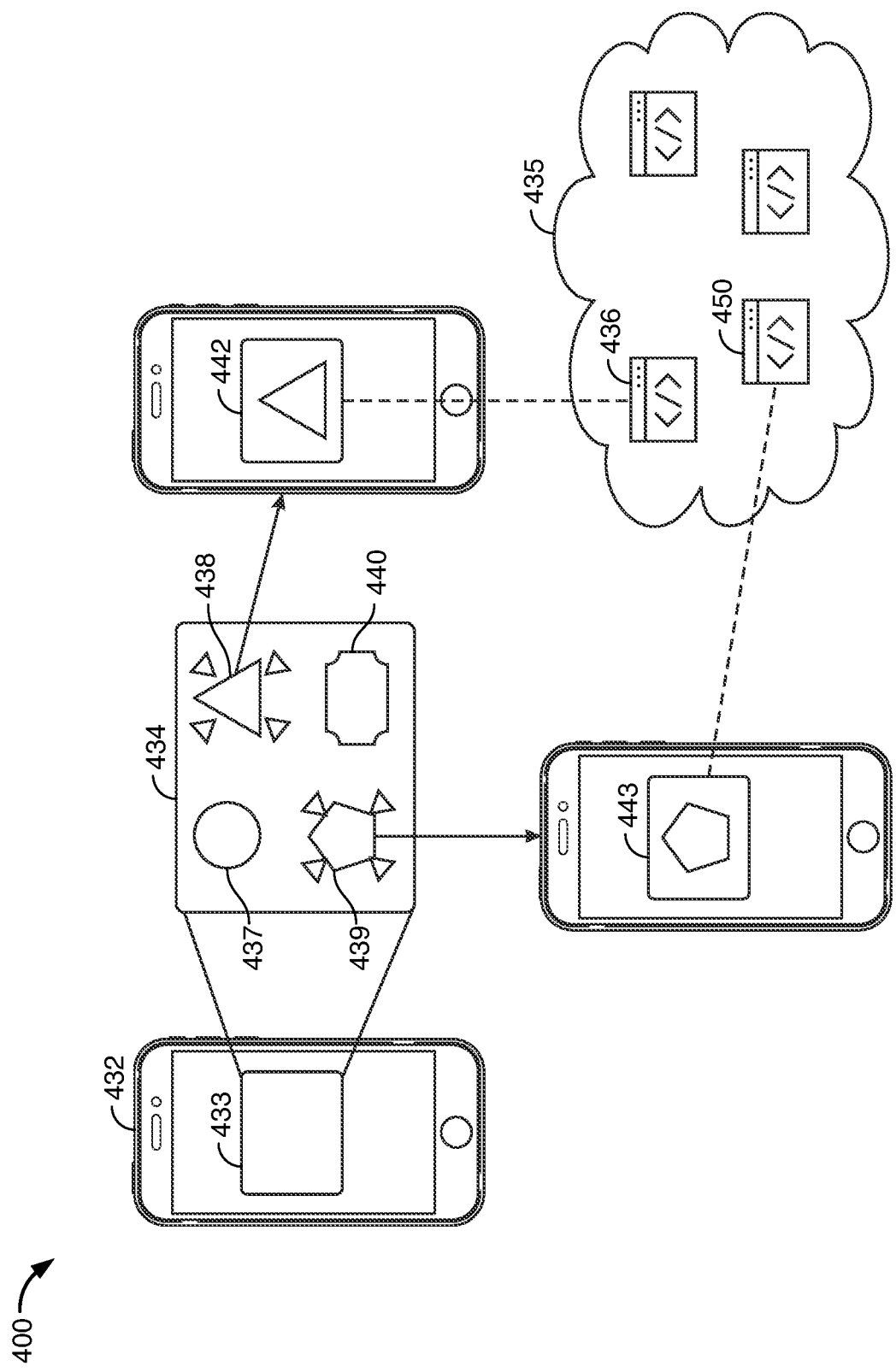
FIG. 4 a diagram depicting a system and information flow for improving access by a user of mobile computing device to a plurality of remotely stored programs.

FIG. 4 is a diagram depicting information flow in a system 400 for improving access by a user of mobile computing device to a plurality of remotely stored programs 436, in accordance with principles of the disclosure. The system may include: a mobile computing device 432; a mobile application 433 that is installed on the mobile computing device; and a remote server 435 housing the programs, and optionally datasets (not depicted) associated with the programs. Two of the programs are numbered 436 and 450. The user interface 434 of the mobile application may be configured to display widgets (as depicted) 437-440, or links or icons, to access each of the programs. When one of the links is selected (indicated by surrounding arrowheads), the mobile application may be configured to display application-like interface 442 or 443; communicate with the remote server (indicted by dotted lines); and run the programs and/or access other content from the mobile computing device (indicted by dotted lines), via the remote server. The content accessed may include the programs 436 and/or datasets associated with the programs. As illustrated, selection of first widget 438 opens first application-like interface 442, which enables user (not depicted) to run first program 436 from mobile device. By contrast, selection of second widget 439 opens second application-like interface 443, which enables user to run second program 450 from mobile device. The first and second programs 438 and 439 may be associated with different datasets (as depicted), or, in other embodiments, the same datasets. In some embodiments, the mobile application may not be configured to access the dataset(s). In other embodiments, the mobile application may not have sufficient capacity to access the datasets. In other embodiments, the mobile application may not be configured to process the dataset(s). In other embodiments, the mobile application does not have sufficient capacity to process the dataset(s). Despite these constraints, the described system enables access to first and second program via an application-like interface, similar to an experience of a user already having the relevant additional mobile applications installed on the mobile computing device.

Figure 5:
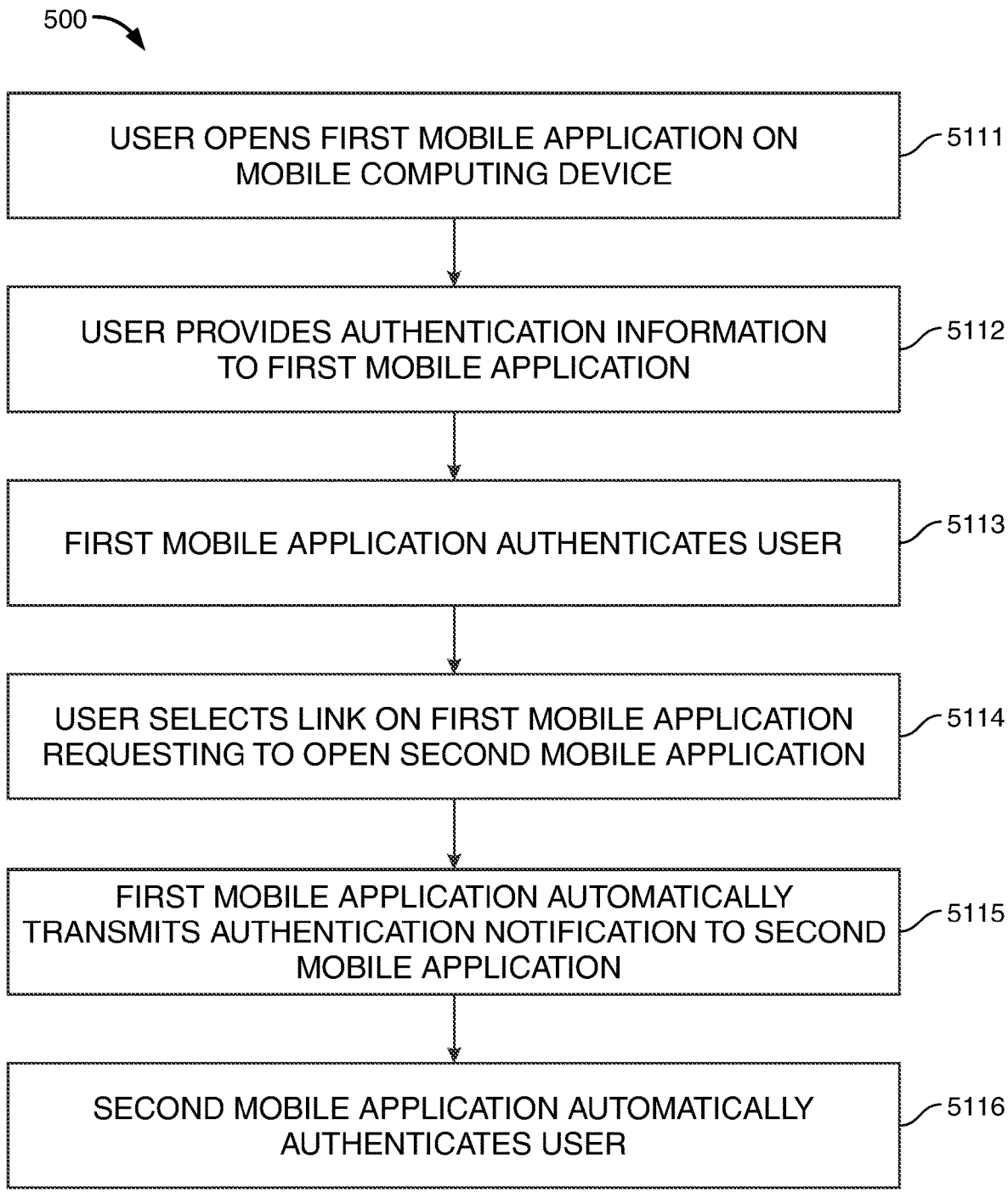
FIG. 5 is a flow chart depicting a method for a user of a mobile computing device to access a plurality of mobile applications installed on the device.

FIG. 5 is a flow chart depicting a method 500 for a user of a mobile computing device to access a plurality of mobile applications installed on the device, in accordance with principles of the disclosure. All components are described, but not depicted. At step 5111, a first mobile application may be opened on the mobile computing device upon activation of a first widget (not depicted) by the user (not depicted). At step 5112, identifying information may be provided. This step may be performed by the user. At step 5113, the user may be authenticated in the first mobile application. At step 5114, the user may select a link displayed on the interface of the first mobile application. At step 5115, the first mobile application may transmit a request to open a second mobile application. At step 5116, the second mobile application may automatically authenticate the user.

Figure 6:
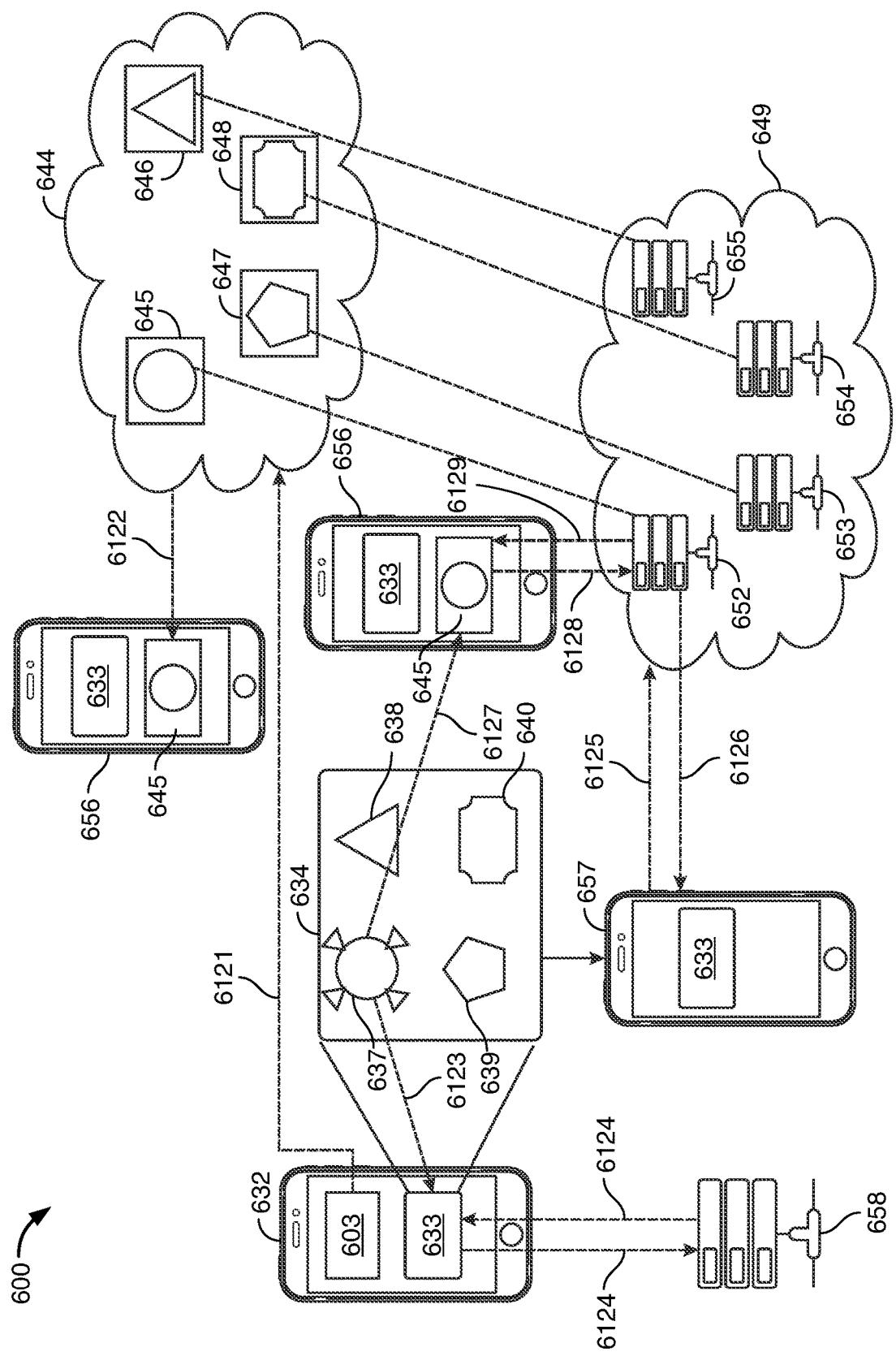
FIG. 6 is a diagram depicting a system for accessing more than one dynamic dataset from a mobile computing device.

FIG. 6 is a diagram depicting a system 600, in accordance with principles of the disclosure. The system may include a mobile computing device 632. The system may also include a first mobile application 633. The first mobile application may be installed on the mobile computing device. Optionally, a copy of the first mobile application may also be stored on the application server. The system may also include a mobile application server 644. The system may also include a plurality of additional mobile applications 645-648. The system may also include a data server 649. The system may also include one or more dynamic datasets 652-655. The dynamic datasets may be stored on the data server.

Each of the additional mobile applications may be mapped to at least one dynamic dataset. In system 600 as depicted, each additional mobile application may be mapped to a separate dynamic dataset. In other embodiments, more than one additional mobile application may be mapped to a single dynamic dataset.

In some embodiments, the application server may store or house the additional mobile applications, and optionally installation packages/installers/software necessary to install the applications. The application server may also be configured to perform the following first and second tasks for at least 2 mobile applications other than the mentioned first mobile application:

At step 6121, the first task, an installation request may be received from the mobile computing device, requesting to download and install the additional mobile applications. The request may originate from processor 603.

At step 6122, the second task, the additional mobile application may be transmitted to the mobile computing device software, thus generating loaded mobile computing device 656. This step may be performed upon receiving the described installation request. In the depicted case, the installed additional mobile application is 645.

In some embodiments, the first mobile application may be configured to perform the following tasks #3-6 for at least one described dynamic dataset. Performance of these tasks may not necessarily be contingent upon execution of steps 6121-6122.

At step 6123, task #3, a content access request, to access the dynamic dataset, may be received. The content access request may be transmitted from the user via user selection of a widget, link, or icon (depicted as widgets 637-640). The widget, link, or icon may be displayed on the interface 634 of the first mobile application.

At step 6124, task #4, the first mobile application may access a database 658 of one or more additional mobile applications mapped to the dynamic dataset for which access is requested. This step may be performed upon receiving the content access request.

Task #5 (not depicted as a separate arrow) may be to determine whether at least one additional mobile application that is mapped to the requested dataset is installed on the mobile computing device.

At step 6125, task #6, as depicted in the left solid arrow of FIG. 6, first mobile application may transmit (directly or indirectly) a dataset access request to the data server. In some embodiments, the transmission may be direct. In other embodiments, the transmission may be indirect. Indirect transmission may include, as non-limiting embodiments, use of a relay station or a receiver device. In some embodiments, the first mobile application may automatically request that the data server streams to the first mobile application the relevant content of the requested dynamic dataset. In some embodiments, the first mobile application may automatically request that the data server stream the relevant content to the mobile device. The content may automatically become accessible via the first mobile application. These steps may be executed when no mapped mobile applications are installed on the mobile device.

In other embodiments, the data server may be configured to perform at least one, at least two, at least three, or all four of the aforementioned tasks #3-6.

In various embodiments, database 658 may be stored externally to mobile computing device 632 (as depicted). In other embodiments, database 658 may be stored in the memory of mobile computing device.

In some embodiments, the nature of the dataset access request may depend on whether at least one mapped additional mobile application is installed on the mobile computing device.

In some embodiments, at step 6127, as depicted in FIG. 6 (pathway indicated by right solid arrow), when least one mapped mobile application is installed on the mobile device (depicted and described as loaded mobile computing device 656, with additional application 645 installed), first mobile application may automatically open the mapped mobile application. The interface of the mapped mobile application may be opened. The interface may be displayed on the screen of the mobile device. In some embodiments, at step 6128, the mapped mobile application in turn may automatically access the requested dataset. In other embodiments, the mapped mobile application automatically requests access to the requested dataset.

In some embodiments, the data server may be configured to perform either, or both, of the following tasks #7-8, depending on the nature of the dataset access request.

At step 6129, Task #7 may be to automatically enable access to the requested dynamic dataset, via the relevant/mapped mobile application. Task #7 may be performed when at least one mapped mobile application is installed on the mobile device. In some embodiments, the mapped mobile application may be already open, or running, on the device. In some embodiments, the mapped application was opened automatically by the first mobile application.

At step 6126, task #8 may be to stream to the first mobile application the relevant content of the requested dynamic dataset. Task #8 may be performed when a mapped mobile application is not installed on the mobile device. The first mobile application may serve as an interface to access the described content. In other embodiments, the relevant content may be streamed to the mobile device.

Figure 7:
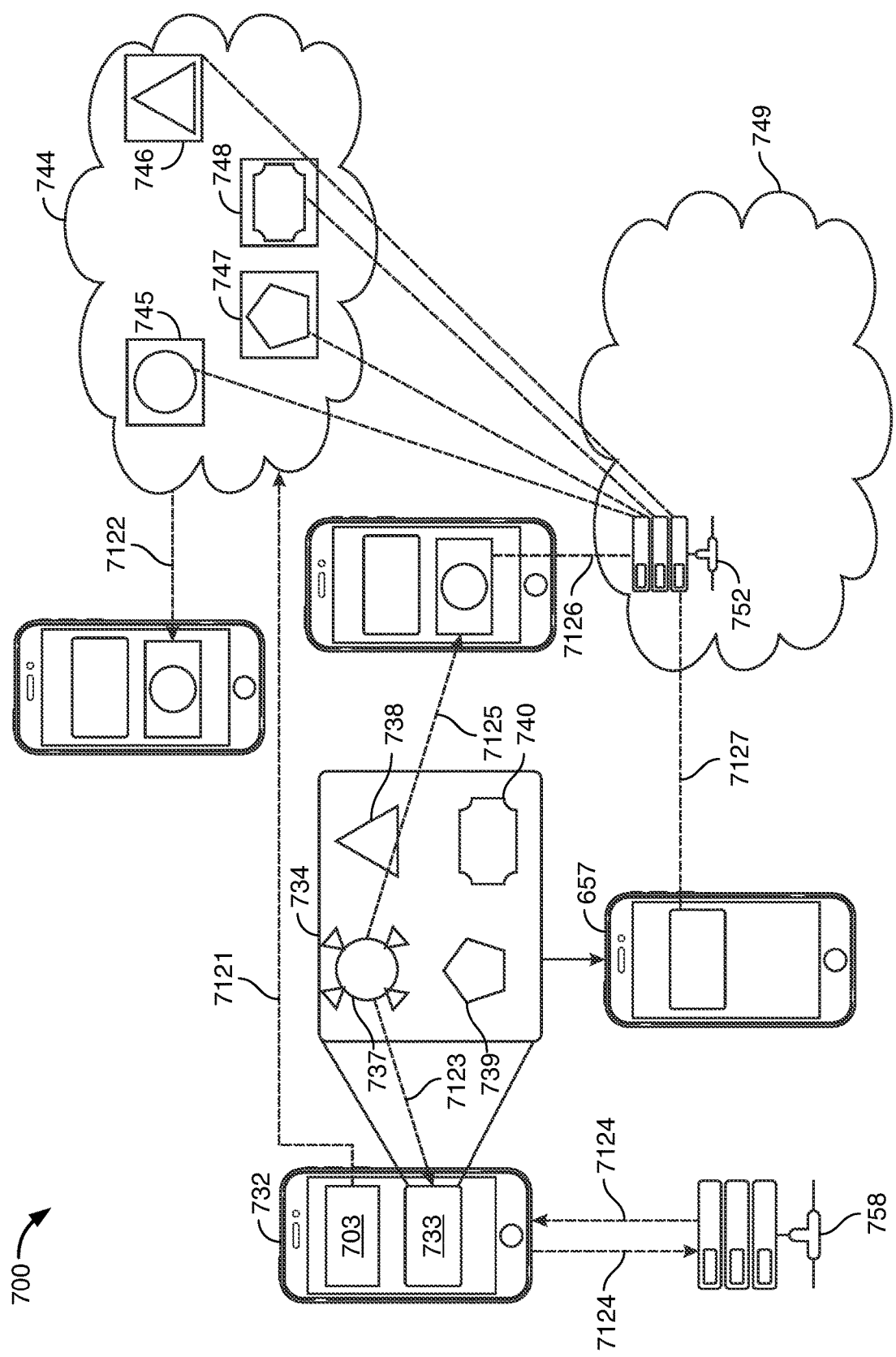
FIG. 7 is a diagram depicting a system for accessing more than one dynamic dataset from a mobile computing device.

FIG. 7 is a diagram depicting a system 700, in accordance with principles of the disclosure. Elements and steps are similar or identical to system 600 depicted in FIG. 6, except as noted herein. Description of common elements and steps is not repeated. In system 700, a single dynamic dataset 752 may be commonly mapped to the additional mobile applications 745-748. Widgets 737-740 correspond to additional mobile applications 745-748, respectively. Selecting any of widgets 737-740 by user may enable accessing dynamic dataset 752, in a manner dependent on the application selected. For example, each additional mobile application may be configured to perform a particular type of data manipulation on dynamic dataset 752; or to access a particular subset of dynamic dataset 752.

First mobile application 733 may ascertain whether the selected additional mobile application is installed on mobile computing device 732. If yes, the selected mobile application may access dynamic dataset 752. If not, first mobile application may automatically stream dynamic dataset 752 to first mobile application 733.

Figure 8:
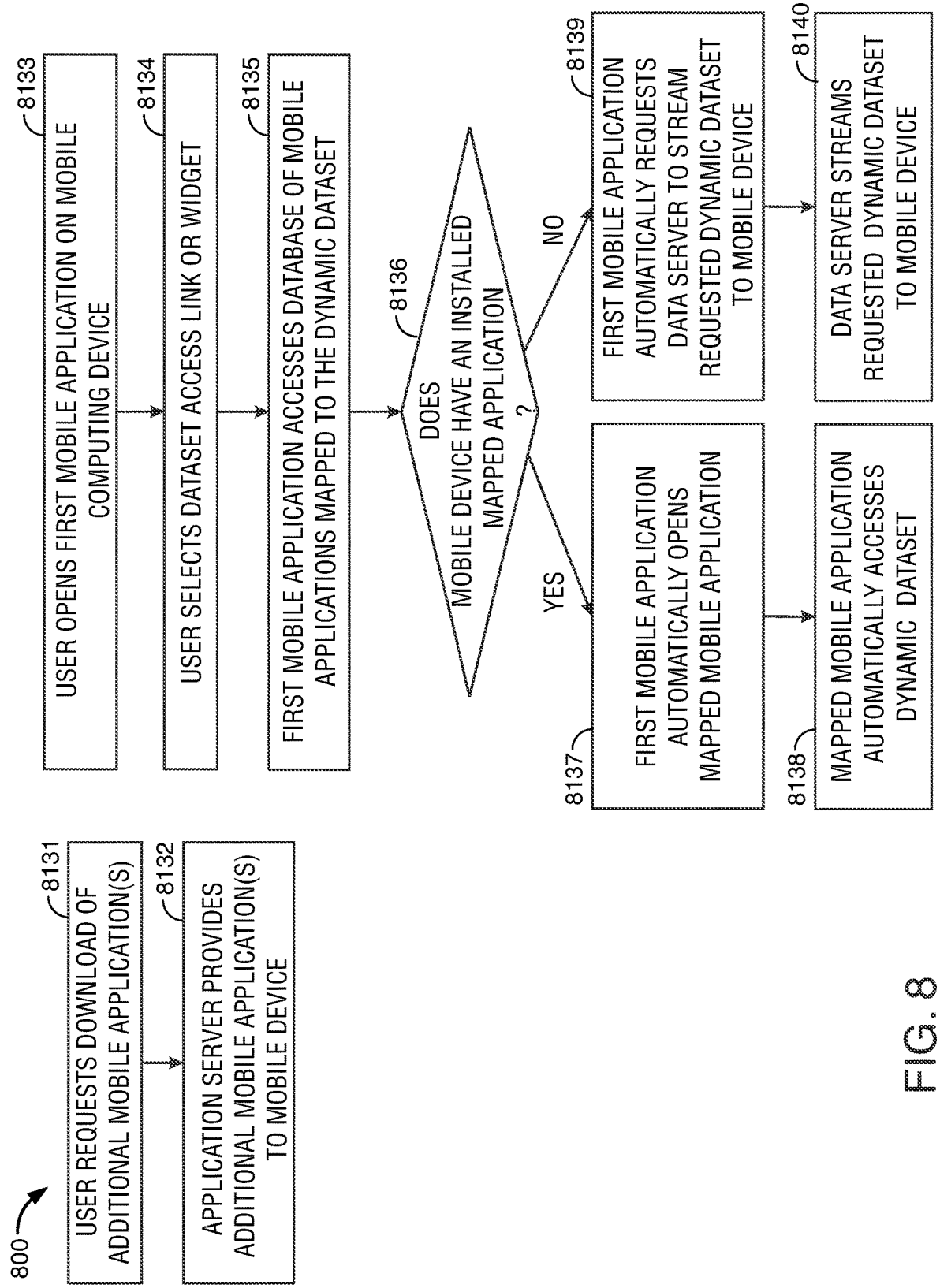
FIG. 8 is a flow chart depicting a method for accessing more than one dynamic dataset from a mobile computing device.

FIG. 8 is a flow chart depicting a method 800, in accordance with principles of the disclosure. The method may be carried out by a first mobile application installed on a mobile computing device, for example as depicted in previous figures and/or as described herein.

Method 800 may utilize a mobile computing device on which a first mobile application is installed. Optionally, at step 8131, a user of the mobile computing device may request download of additional mobile application(s) via a download widget for one of additional mobile application(s). The additional mobile application(s) may be configured to access a desired dynamic dataset. Mobile computing device may transmit the request to a remote application server, which, at step 8132, may provide the additional mobile application(s) to the mobile device. The request to download the additional mobile application(s) may be received, in various embodiments, either through the first mobile application, a mobile application store, or another interface.

At step 8133, the user may open the first mobile application on the mobile computing device. Step 8133 may be performed regardless of whether additional mobile application(s) were downloaded onto mobile device. At step 8134, the user may select a dataset access link or widget, which may be displayed on interface of the first mobile application. Dataset access link or widget may map to a dynamic dataset of interest, which may be stored on a remote data server. Dataset access link or widget may appear similar or identical to the aforementioned download widget. However, when selected from within first mobile application, dataset access link or widget does not necessarily cause mobile device to download a particular mobile application.

At step 8135, the first mobile application may subsequently access a database of mobile applications mapped to the dynamic dataset. At step 8136, the first mobile application may determine whether one or more of the mapped mobile applications is installed on the mobile device.

If yes, the first mobile application may automatically open the mapped mobile application—or more than one mapped mobile applications, if necessary to accomplish the desired access and manipulations of the dynamic dataset (step 8137)—and the mapped mobile application(s) may automatically access the dynamic dataset (step 8138).

If no mapped mobile application is installed on the mobile device, at step 8139, the first mobile application may automatically transmit a request to the data server to stream the requested dynamic dataset to the mobile device. At step 8140, the data server then may stream the requested dynamic dataset to the mobile device.

Figure 9:
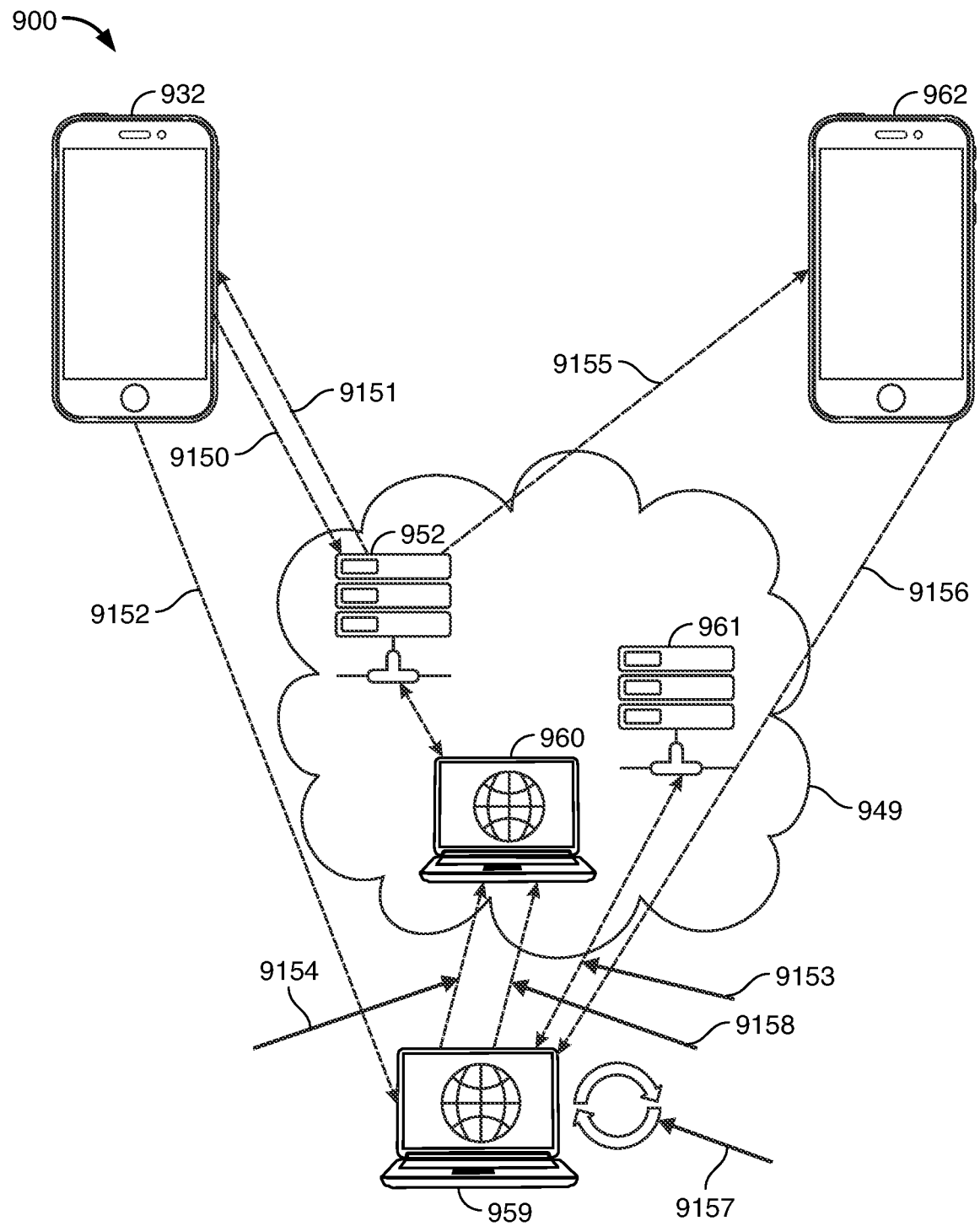
FIG. 9 is a schematic diagram, illustrating a process for using a machine learning algorithm to improve data configurations, for streaming from a data server to a mobile application.

FIG. 9 is a schematic diagram, illustrating a process 900 for using a machine learning algorithm 959 to improve data configurations, for streaming from a data server to a mobile application, in accordance with principles of the disclosure. The improvement may be automatic and iterative. In the context of a system or method for accessing a dynamic dataset from a mobile device, at step 9150, a mobile computing device 932 may request access to a dynamic dataset 952 stored on a cloud or a remote data server 949. The system or method may be any of the systems or method described herein. The system or method may be a system or method depicted in any of FIGS. 3-8. At step 9151, a central processor 960 associated with the cloud or remote server may stream the dataset to the mobile computing device, using the default data configuration rules (not depicted) for that dataset. At step 9152, results of the data streaming step, including the data configuration utilized, may be transmitted (e.g., from the mobile device) to and evaluated by an artificial intelligence or machine learning engine or algorithm 959. At step 9153, the algorithm may obtain alternative data configuration(s) from a data configuration rule repository 961, which may be optionally stored on the cloud or remote server, as depicted. At step 9154, the algorithm may instruct the central processor to utilize the alternative data configurations for a future data streaming operation(s), for example for access to the dataset by different users. At step 9155, the central processor may use the alternative data configuration for a future streaming step, for example to a different mobile device 962. At step 9156, results of data streaming using alternative data configurations may be similarly evaluated by the algorithm. At step 9157, the results of the different streaming operations may be used to train the algorithm. At step 9158, the algorithm may propose revised default streaming data configuration rules. Alternatively, in lieu of step 9153, the algorithm may draft new data configuration rules for streaming to the mobile device (not depicted). Subsequently, the process may continue from step 9154 onward. The algorithm may iteratively perform this process (not depicted) to optimize data configurations for a particular type of dataset, a particular mobile application, or a combination of a particular type of dataset with a particular mobile application. Iterations may continue until the engine or algorithm determines that optimization of the data configuration rules is sufficient to create new default rules, after which step 9158 may be performed.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium may include a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model may be utilized. The regulated ML model may be designed to make incremental learning adjustments in tandem with the determinations made by the machine learning engine and communicated to the regulated ML model. The machine learning engine accesses data outputted from data streaming operations, and it may be trained to use data from the operations to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products for combined mobile applications are provided. Persons skilled in the art will appreciate that the present invention can be practiced by other than the described embodiments, which are presented for purposes of illustration rather than of limitation.

What is claimed is:

1. A system, comprising:
a mobile computing device;
a first mobile application;
a plurality of additional mobile applications;
a mobile application server;
a data server; and
one or more dynamic datasets,
wherein:
   said first mobile application is installed on said mobile computing device;
   said dynamic dataset(s) is/are stored in (on) said data server;
   each of said plurality of additional mobile applications is mapped to at least one of said dynamic dataset(s);
   said application server stores said plurality of additional mobile applications;
   said application server is configured to, for each of said plurality of additional mobile applications:
      receive an installation request from said mobile computing device to download and install said additional mobile application; and
      upon receiving said installation request, transmit to said mobile computing device said additional mobile application;
   and said first mobile application is configured to, for each of said dynamic dataset(s):
      receive a content access request, via user activation of a link displayed on an interface of said first mobile application, to access said dynamic dataset, hereinafter referred to as a requested dynamic dataset;
      upon receiving said content access request, access a database of one or more of said plurality of additional mobile applications that are mapped to said requested dynamic dataset, said additional mobile application(s) hereinafter referred to as mapped additional mobile application(s); and
      determine whether at least one of said mapped additional mobile application(s) is installed on said mobile computing device;
   wherein:
      when at least one of said mapped mobile application(s) is installed on said mobile computing device, then said first mobile application automatically opens one of said mapped mobile application(s); and said mapped mobile application automatically requests access to the requested dataset(s); and
      when none of said mapped mobile application(s) are installed on said mobile computing device, then said first mobile application automatically requests that said data server stream the requested dynamic dataset(s) to the mobile device,
   and:
   said data server is configured to perform the following operations:
      enable said mapped mobile application(s) to access said requested dynamic dataset; and
      stream said requested dynamic dataset to said first mobile application.

2. The system of claim 1, wherein said application server houses said first mobile application.

3. The system of claim 1, wherein said plurality of additional mobile applications are each configured to accept authentication in said first mobile application in lieu of further authentication in said additional mobile application.

4. The system of claim 1, wherein said requested dynamic dataset is accessible via a usual interface of said first mobile application.

* * * * *